(12) United States Patent
David

(10) Patent No.: US 11,126,678 B2
(45) Date of Patent: Sep. 21, 2021

(54) METHOD AND SYSTEM TO FILTER OUT HARASSMENT FROM INCOMING SOCIAL MEDIA DATA

(71) Applicant: Corinne Chantal David, San Francisco, CA (US)

(72) Inventor: Corinne Chantal David, San Francisco, CA (US)

( * ) Notice: Subject to any disclaimer, the term of this patent is extended or adjusted under 35 U.S.C. 154(b) by 5 days.

(21) Appl. No.: 16/786,225

(22) Filed: Feb. 10, 2020

(65) Prior Publication Data

US 2020/0285683 A1     Sep. 10, 2020

Related U.S. Application Data

(60) Provisional application No. 62/813,752, filed on Mar. 5, 2019, provisional application No. 62/847,818, filed on May 14, 2019, provisional application No. 62/847,885, filed on May 14, 2019.

(51) Int. Cl.
| | |
|---|---|
| *G06F 16/9536* | (2019.01) |
| *G06F 40/289* | (2020.01) |
| *G06F 40/53* | (2020.01) |
| *G06F 16/9538* | (2019.01) |

(52) U.S. Cl.
CPC ...... *G06F 16/9536* (2019.01); *G06F 16/9538* (2019.01); *G06F 40/289* (2020.01); *G06F 40/53* (2020.01)

(58) Field of Classification Search
CPC . G06F 16/9536; G06Q 10/107; H04L 51/046; H04L 51/22; H04L 51/24; H04L 51/28; H04L 51/36

USPC .......................................................... 707/754
See application file for complete search history.

(56) References Cited

U.S. PATENT DOCUMENTS

| | | | |
|---|---|---|---|
| 5,946,673 | A | 8/1999 | Francone |
| 5,987,606 | A | 11/1999 | Cirasole |
| 6,308,175 | B1 | 10/2001 | Lang |
| 7,103,534 | B2 | 9/2006 | Goodman |

(Continued)

FOREIGN PATENT DOCUMENTS

| | | |
|---|---|---|
| WO | WO 2014/151999 A1 | 9/2014 |
| WO | WO2014151199 A1 | 9/2014 |

OTHER PUBLICATIONS

B Chesney, "Deep Fakes: A Looming Challenge for Privacy, Democracy, and National Security," 2018, California Law Review, USA.

(Continued)

*Primary Examiner* — Sheree N Brown

(57) ABSTRACT

Social media users are subject to harassment when unwanted offending content reaches them. Social media companies are reluctant to police content. The Emakia system provides a solution at the point where incoming real-time data are received. The Emakia system proposes to use sets of Machine Learning classifiers to filter text, images, audio, and video. Classifiers are trained with labeled data. After training, the model is used to screen the incoming real-time data. On the user mobile device, only approved content is displayed. The unwanted data are still available if the user desires to access them. The system provides multiple classifiers and customized models to the individual user. When harassment content is detected a report is sent to an entity who can help support the receiver.

1 Claim, 12 Drawing Sheets

(56) References Cited

U.S. PATENT DOCUMENTS

Figure 1:
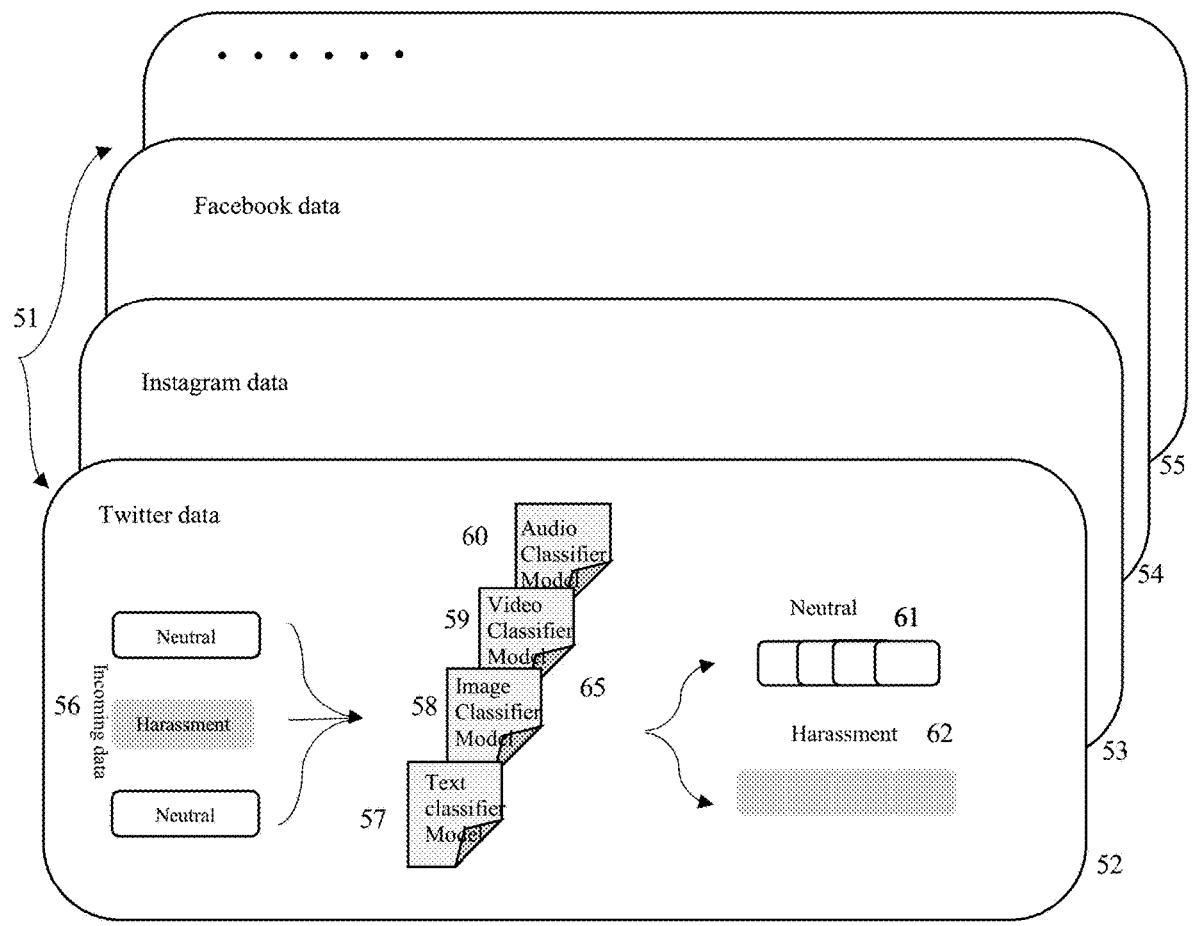

| | | |
|---|---|---|
| 7,171,450 B2 | 1/2007 | Wallace |
| 7,496,628 B2 | 2/2009 | Arnold |
| 8,224,950 B2 | 7/2012 | Humes |
| 8,266,148 B2 | 9/2012 | Guha |
| 8,386,401 B2 | 2/2013 | Virkar |
| 8,504,504 B2 | 8/2013 | Liu |
| 8,515,049 B2 | 8/2013 | Chavez |
| 8,594,996 B2 | 11/2013 | Liang |
| 8,838,633 B2 | 9/2014 | Dhillon |
| 9,686,217 B2* | 6/2017 | Prabhu ............... G06F 3/04842 |
| 9,703,986 B1* | 7/2017 | Ashley ................. H04L 63/126 |
| 9,762,462 B2* | 9/2017 | Cherifi .................... H04L 67/22 |
| 10,031,977 B1 | 7/2018 | Maycock |
| 10,073,830 B2* | 9/2018 | Walia .................... G06F 40/211 |
| 10,097,511 B2 | 10/2018 | Sullivan |
| 10,229,203 B2 | 3/2019 | Li |
| 10,235,639 B1 | 3/2019 | Mandel |
| 10,795,926 B1* | 10/2020 | von Essen ............. G06F 16/51 |
| 2004/0122810 A1 | 6/2004 | Mayer |
| 2011/0145833 A1 | 6/2011 | De Los Reyes |
| 2012/0030293 A1 | 2/2012 | Bobotek |
| 2012/0151046 A1* | 6/2012 | Weiss .................. G06F 11/3438 709/224 |
| 2012/0151047 A1* | 6/2012 | Hodges .................. G06Q 50/01 709/224 |
| 2013/0332545 A1* | 12/2013 | Primus .................... H04L 51/12 709/206 |
| 2013/0340089 A1* | 12/2013 | Steinberg ................ H04L 51/12 726/27 |
| 2014/0280553 A1* | 9/2014 | Hernandez ............ H04W 4/023 709/204 |
| 2015/0120583 A1 | 4/2015 | Zarrella |
| 2015/0249584 A1* | 9/2015 | Cherifi .................... G09B 5/00 709/224 |
| 2015/0254566 A1 | 9/2015 | Chandramouli |
| 2015/0365366 A1* | 12/2015 | Prabhu ................. H04L 51/046 709/206 |
| 2016/0255037 A1 | 9/2016 | Spivack |
| 2017/0061248 A1* | 3/2017 | Ryan, Jr. ................. H04L 67/10 |
| 2018/0046475 A1 | 2/2018 | Wei |
| 2018/0196876 A1* | 7/2018 | Abou Mahmoud ... G16H 20/70 |
| 2018/0216946 A1 | 8/2018 | Gueye |
| 2018/0349502 A1* | 12/2018 | Maycock ............. G06F 3/0484 |
| 2019/0019109 A1 | 1/2019 | Sadaghiani |
| 2019/0065532 A1* | 2/2019 | Conahan ................ G06Q 50/01 |
| 2019/0149500 A1 | 6/2019 | Hodge |
| 2019/0180245 A1 | 6/2019 | Weindling |
| 2020/0028810 A1* | 1/2020 | Werner ............. G06K 9/00302 |

OTHER PUBLICATIONS

N Lipka, "Modeling Non-Standard Text Classification Tasks," Doctoral Thesis 2013 Dr. rer. nat. Germany.
Hao Li, "Image Analysis of cyberbully using Machine Learning techniques," Master Thesis, 2016, Pennsylvania, USA.
H Hosseinmardi, "Detection of Cyberbullying Incidents on the Instagram Social Network", Social and Information Networks cs.SI, Boulder Colorado, USA.
Xin Xie, "An improved algorithm for sentiment analysis based on maximum entropy", Springer-Verlag GmbH, 2017, Germany.
C K. Themeli, "Hate Speech Detection using different text representations in online user comments", MSc Thesis, 2018, Athens, Grece.
A Founta, "A Unified Deep Learning Architecture for Abuse Detection", 218, Alabama, USA.
https://developer.apple.com/videos/play/wwdc2019/232/ converted the file into a pdf but is was too big to upload it.
C Sapp, "Preparing and Architecting for Machine Learning", Gartner Professional advice, 2017, Stamford, USA.
M Wiegand, "Inducing a Lexicon of Abusive Words—A Feature-Based Approach", Proceedings of NAACL-HLT 2018, pp. 1046-1056, New Orleans, USA.
Quanzeng You, "Visual Sentiment Analysis by Attending on Local Image Regions", in Proc. 31st AAAI Conf. Artif. Intell., 2017, pp. 231-237, New York, USA.
A. Berger, "A Maximum Entropy Approach to Natural Language Processing." 1996 Computational Linguistics, vol. 22, No. 1, New York, USA.
T. Davidson, "Automated hate speech detection and the problem of offensive language," in Proc. of ICWSM, 2017, New York, USA.
J. Golbeck "A large labeled corpus for online harassment research," In Proc. of ACM 2017, University of Maryland, USA.
R. Kohavi "Glossary of terms, Machine Learning," 1998, vol. 30, Nos. 2-3, pp. 271-274.
J. Nam "A deep bag-of-features model for music auto-tagging," IEEE, 2016, Seoul, Korea.
K. Nigam, "Using maximum entropy for text classification," in IJCAI—99 workshop on machine learning for information filtering 1 (1), 61-67, 1999, Pittsburgh, USA.
Z. Waseem, "Hateful symbols or hateful people? predictive features for hate speech detection on Twitter," in Proc. of the NAACL 2016, Copenhagen, Denmark.
J.-M. Xu, "Learning from bullying traces in social media," in HLT-NAACL, The Association for Computational Linguistics, 2012, pp. 656-666, Madison, USA.
H. Zhong, "Content-driven detection of cyberbullying on the Instagram social network," 2016, IJCAI AAAI, pp. 3952-3958, Pennsylvania, USA.

* cited by examiner

Gui Portal

Before training ML text Classifier, the data is
separated in two sets. Training set and testing set Training set → 701

702

703
Testing set

702

704

Training data is separated by the classifier in 2 new sets one training and one testing.

Machine Learning

210

57

Text Classifier Model

705
Accuracy on the training data

Testing set

703

57

706
Accuracy on the test data

METHOD AND SYSTEM TO FILTER OUT HARASSMENT FROM INCOMING SOCIAL MEDIA DATA

1 CROSS REFERENCE

This application claims the benefit of and priority under 35 U.S.C. § 119(e) to U.S. Patent Application No. 62/813,752, filed on Mar. 5, 2019, entitled, "System to filter out harassment on social media on the receiver side," which is incorporated herein by reference in its entirety.

This application claims the benefit of and priority under 35 U.S.C. § 119(e) to U.S. Patent Application No. 62/847,818, filed May 15, 2019, entitled "System filters out harassment from incoming social media data," which is incorporated herein by reference in its entirety. This application claims the benefit of and priority under 35 U.S.C. § 119(e) to U.S. Patent Application No. 62/847,885, filed May 15, 2019, entitled "System to filter out harassment on social media on the receiver side," which is incorporated herein by reference in its entirety.

2 BACKGROUND AND PRIOR ART

In a Jan. 19, 2019 interview, Jack Dorsey, one of the founders and the Chief Executive Officer of Twitter revealed how surprised he and his colleagues were at the prevalence of social media harassment: "We weren't expecting any of the abuse and harassment, and the ways that people have weaponized the platform." Dorsey explained that they felt "responsible about it." See Appendix, p. 1.

Social media companies allow users to report abuse and require verification by e-mail address, phone number or the identification of pictures in order to prevent robotic contact attempts. But these mechanisms have proven fruitless to stop harassment. Improvements in ML technology, however, provide an opportunity to counter harassment.

ML algorithms are used to train known labeled data for predicting the label of unlabeled data. This computational process is called a "classifier." Classifiers can be applied to text, images, audio, and video. In the 1990s, a variety of text classification techniques started to demonstrate reasonable performance.

Text classifiers have become more accurate. News providers have taken the lead in protecting conversations with their readers or viewers from bad actors by using machine learning technology to approve comments for publication on their websites. The Times, for instance, partnered in 2016 with a Google-owned technology incubator to score incoming comments by comparing them to more than 16 million labeled Times comments going back to 2007. Bassey Etim, "The Times Sharply Increases Articles Open for Comments, Using Google's Technology," New York Times, Jun. 13, 2017. See Appendix, p. 16.

Patent No. U.S. Ser. No. 10/031,977B1 issued on Jul. 24, 2018, to Maycock, describes a solution to the problem of harassment on social media. Maycock's patent solves the issue by filtering the data at the operating system level of the user device. But accessing the operating system (called "jailbreaking") may violate user licensing agreement and the law. (See 17 U.S.C, § 1201.) The Emakia system proposes to resolve the issue at a higher level with the use of Representational State Transfer Rest Application Programming Interface API and Webhook to transfer the data.

3 SUMMARY

Social media users increasingly complain of harassment through the receipt of unwanted content. Some users no longer feel safe expressing themselves on social media as a result of being subjected to such content. It is unrealistic to expect that people refrain from social media use to avoid such harassment. Social media use has become a necessity in our economic and social lives. Therefore, the need exists to filter out unwanted content, thereby creating a safer social media environment. Social media companies have been loath to police content on the sender side. Abusive senders have been removed from social media platforms but not with an automated system. Removal, a rare occurrence, is subject to individual human evaluations. Moreover, such interventions take place after the fact.

The Emakia method and system offer a solution at the point where data are received. The Emakia system filters text, images, audio, and video. Incoming text is filtered through a text classifier. A set of trained Machine Learning (ML) classifier models separate unwanted content and assign it to a separate set. Only acceptable content is displayed but the user retains the ability to access the filtered out material. Reporting of the harassment is automated, obviating the need for the user to take affirmative steps for each instance of harassment. The main benefits of the Emakia system are the filtering out of harassing content prior to viewing by recipients and automated reporting.

4 BRIEF DESCRIPTION OF DRAWINGS

FIG. 1—Classifiers filter out harassment from incoming data from different platforms.

Figure 2:
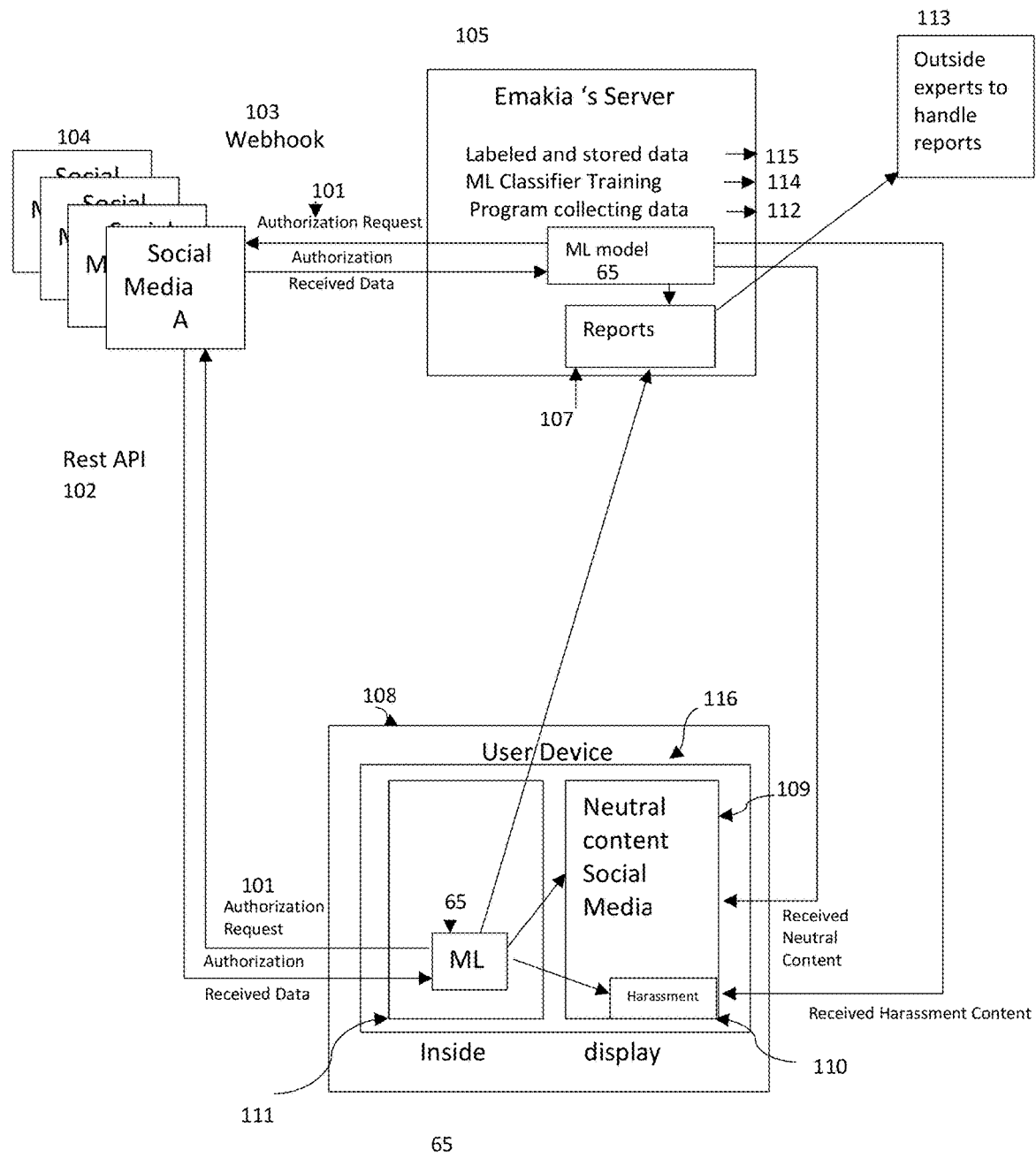

FIG. 2—Emakia system receiver side.

Figure 3:
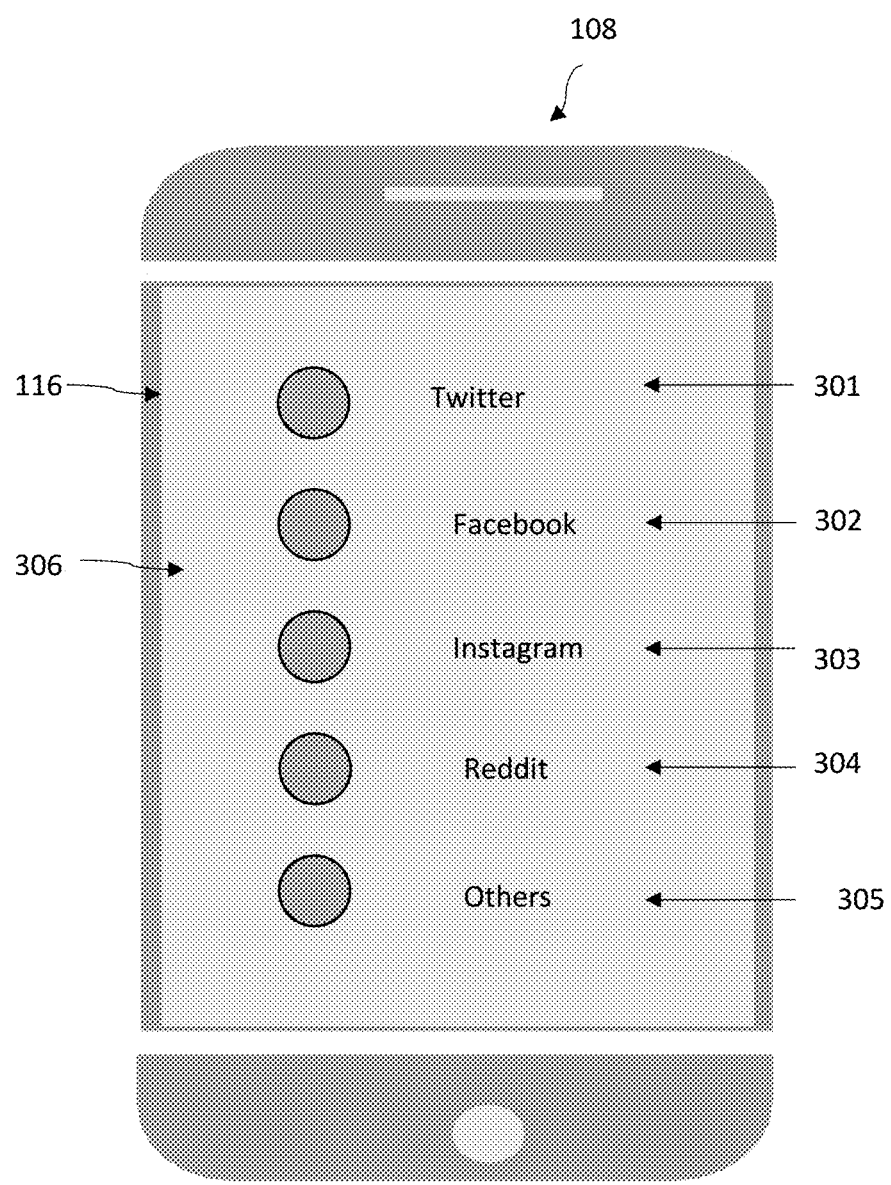

FIG. 3—Portal to access the different social media platform data.

Figure 4:
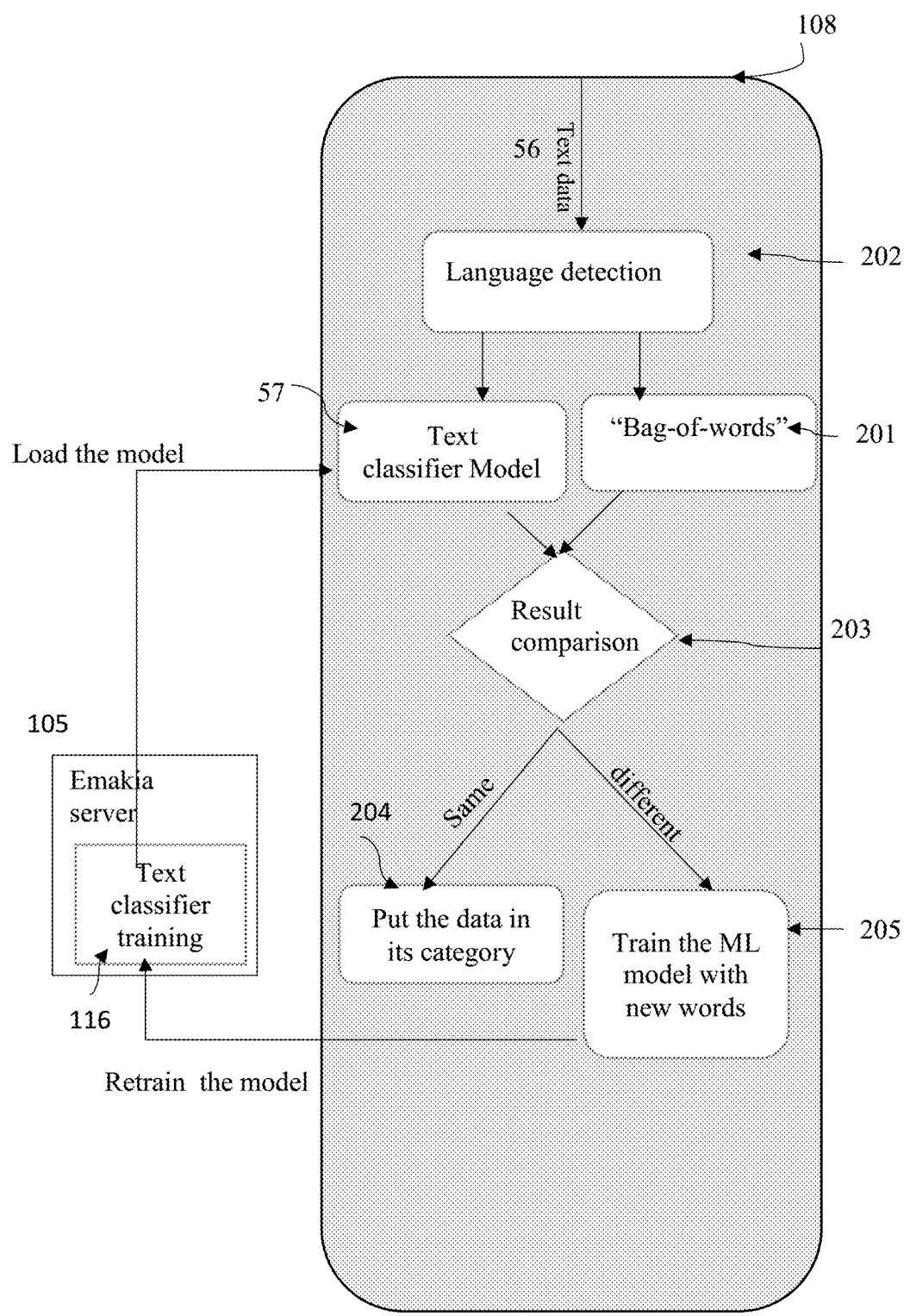

FIG. 4—Algorithm for filtering out harassment on text.

Figure 5:
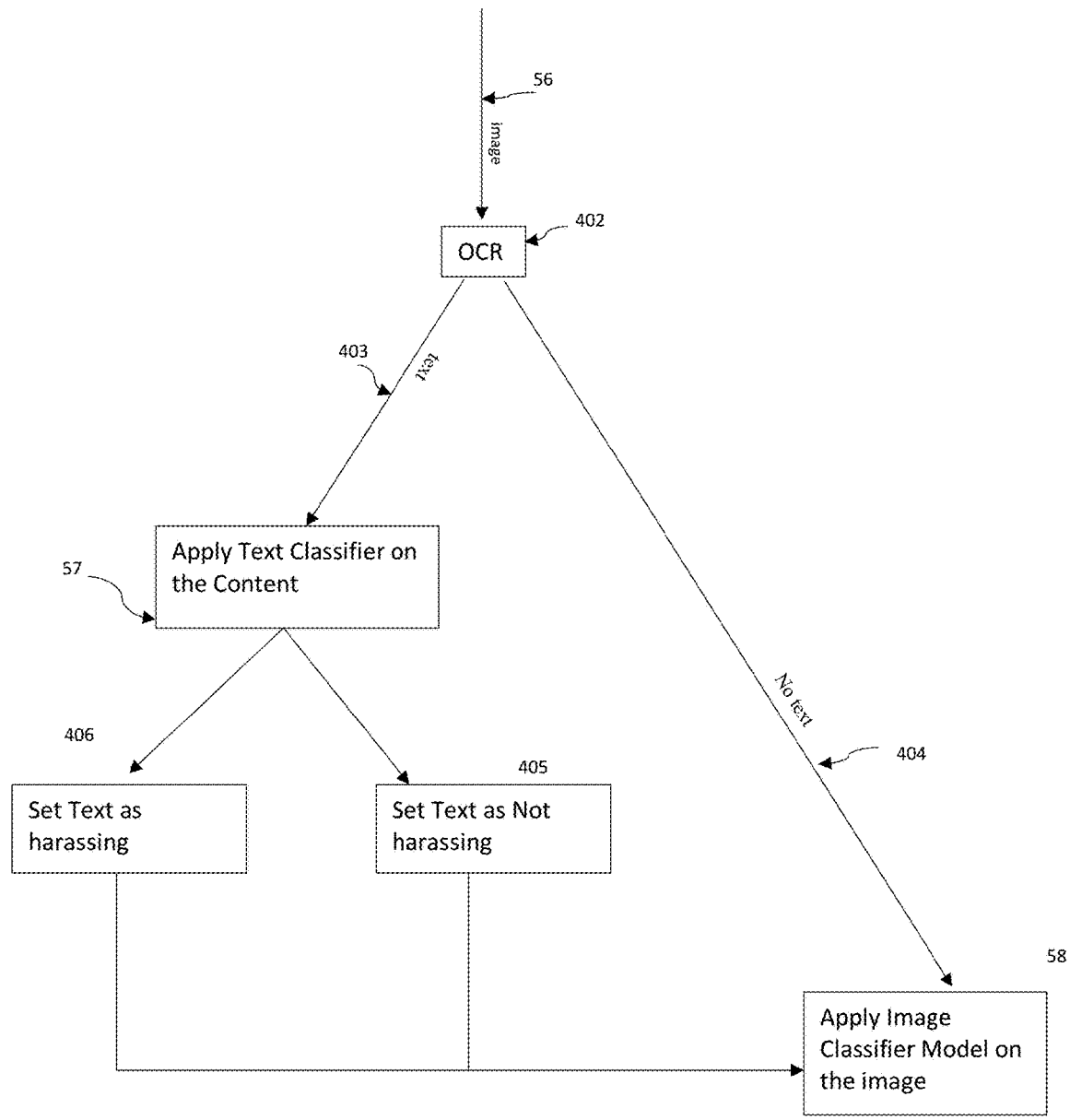

FIG. 5—Algorithm to find the text on an image to filter out harassment.

Figure 6:
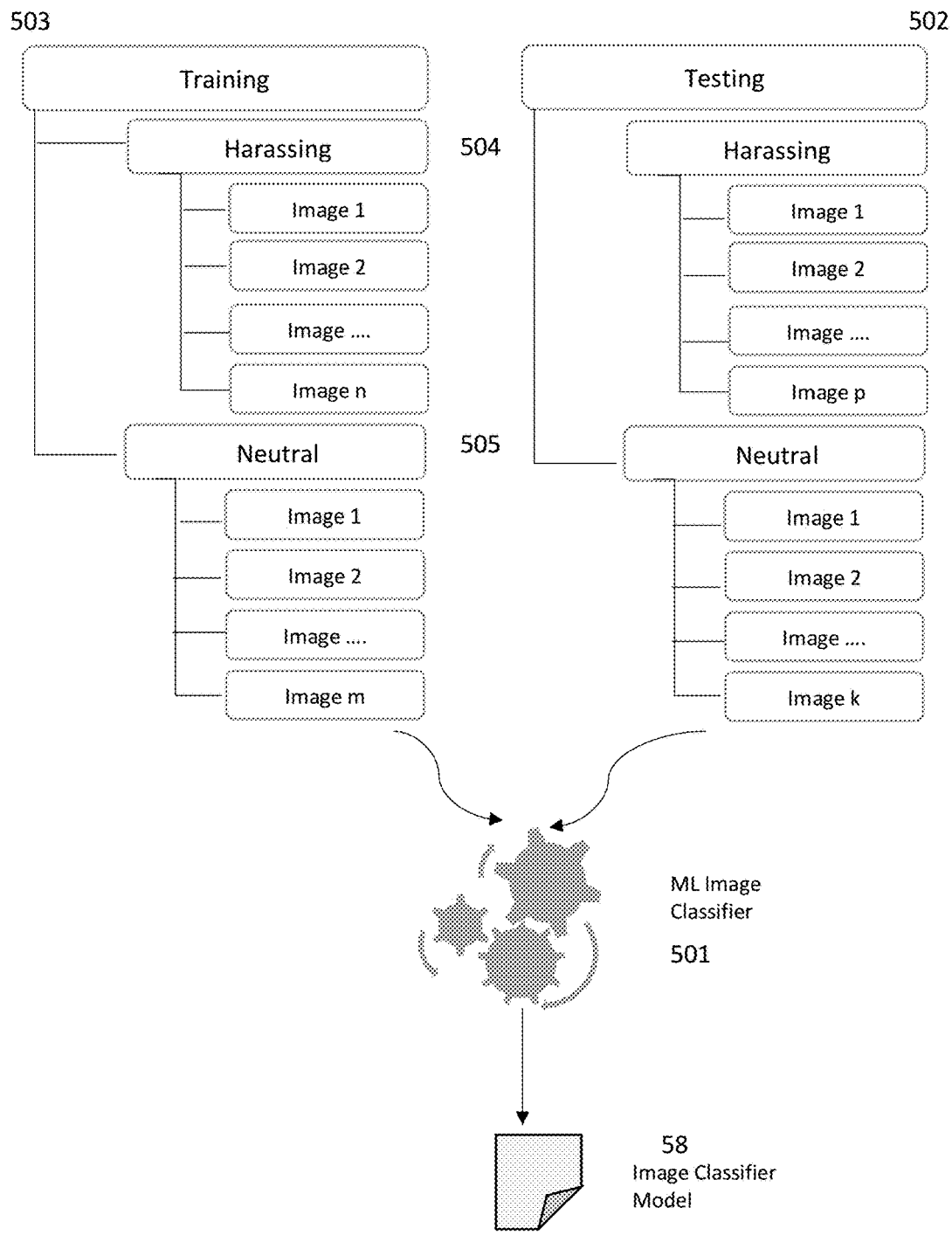

FIG. 6—Folder structure to enter data into the ML classifiers.

Figure 7:
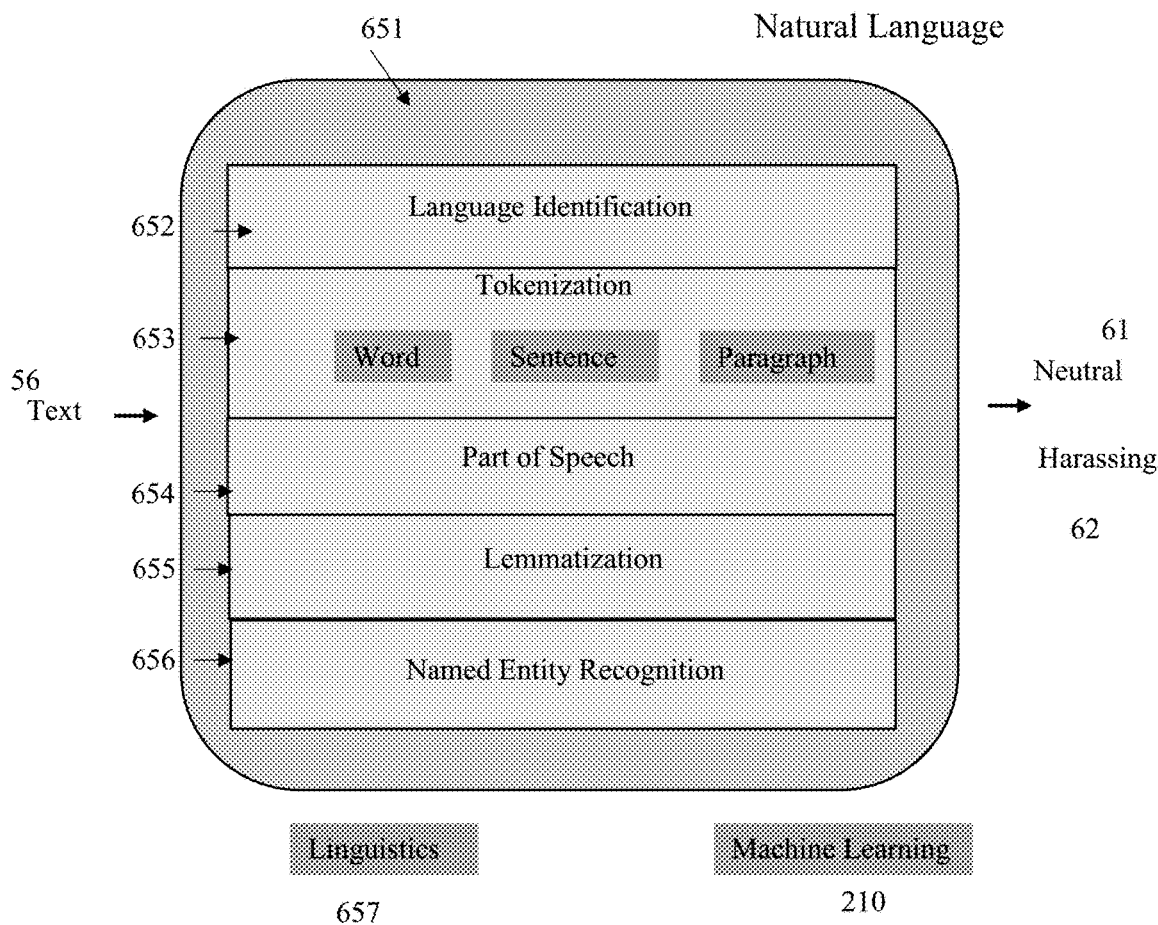

FIG. 7—Tools for extracting features from text, natural language and machine learning.

Figure 8:
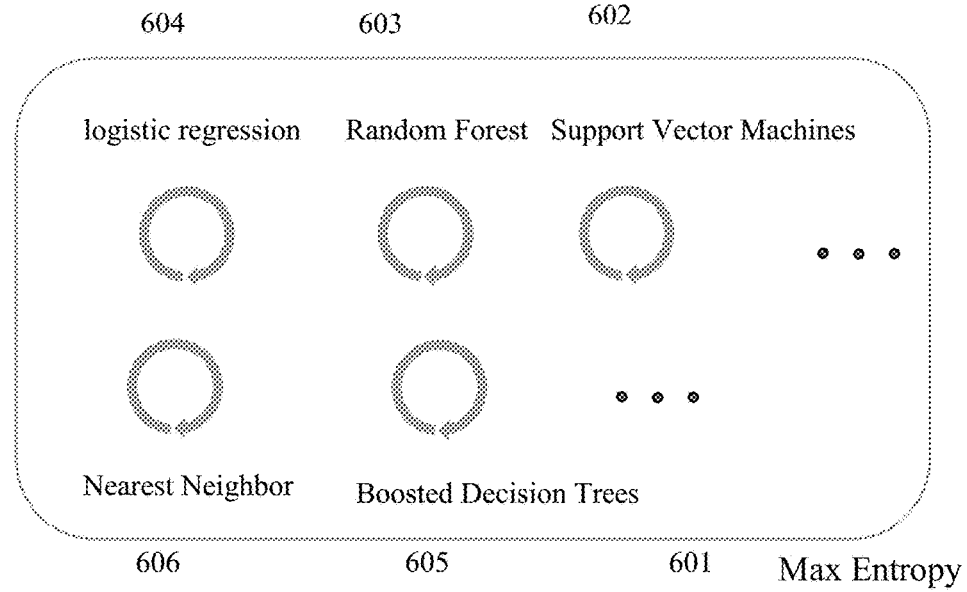

FIG. 8—Max Entropy with different algorithms to run.

Figure 9:
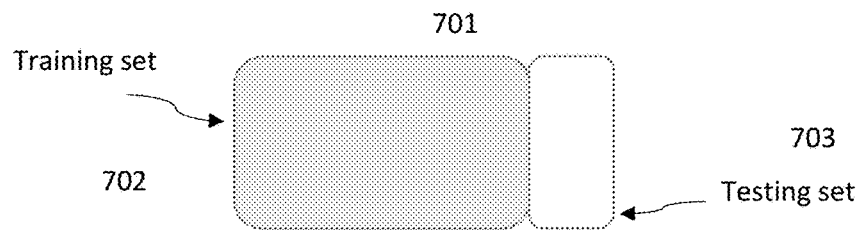
Figure 9:
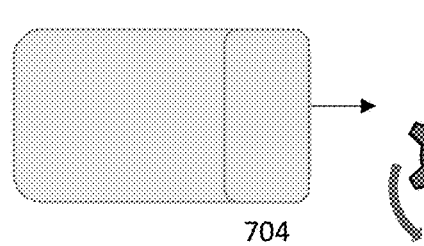

FIG. 9—Training and test data to train and test ML classifier to create a model.

Figure 10:
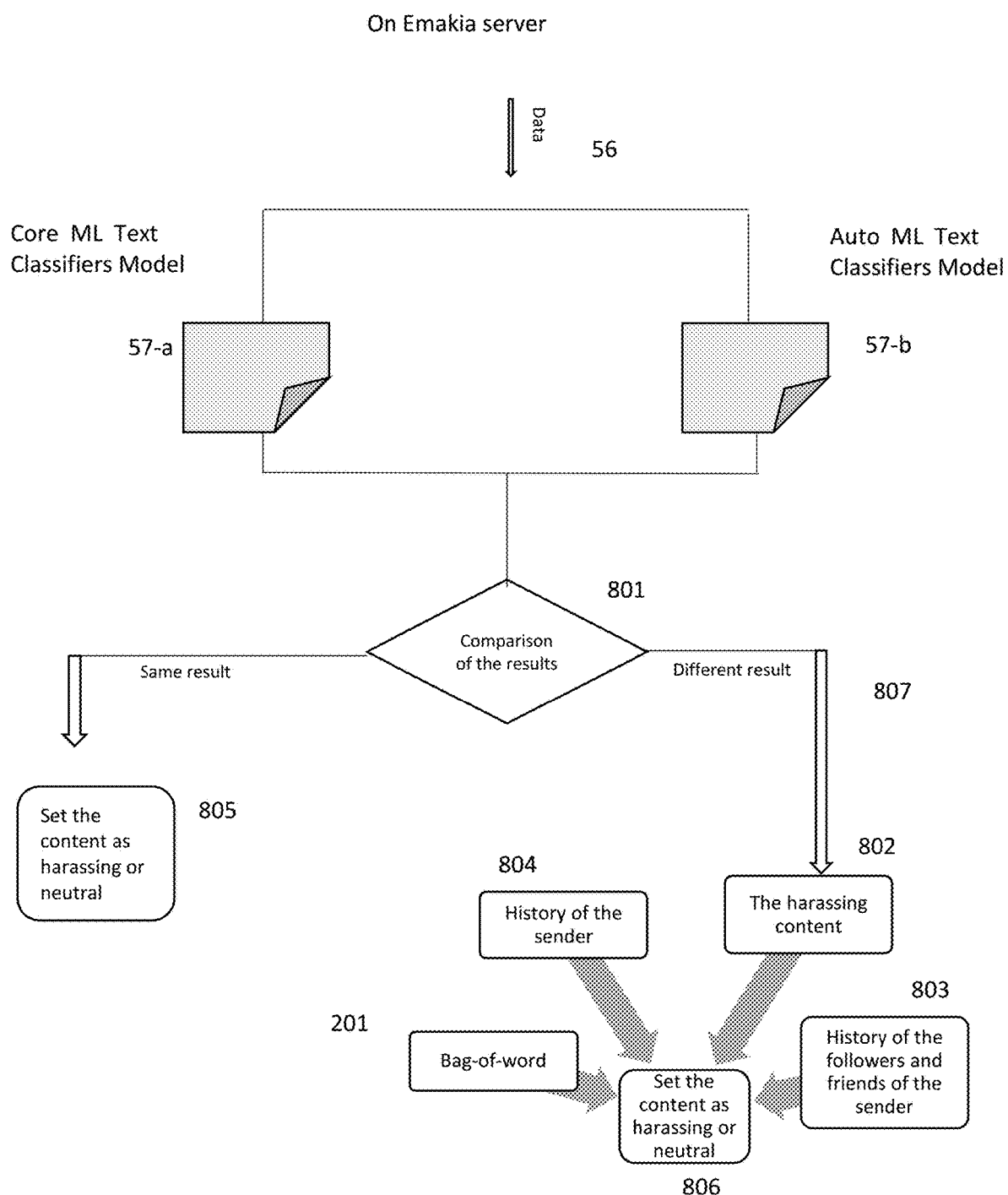

FIG. 10—Improving the results by comparing the Core ML 3 and Auto ML classifier.

Figure 11:
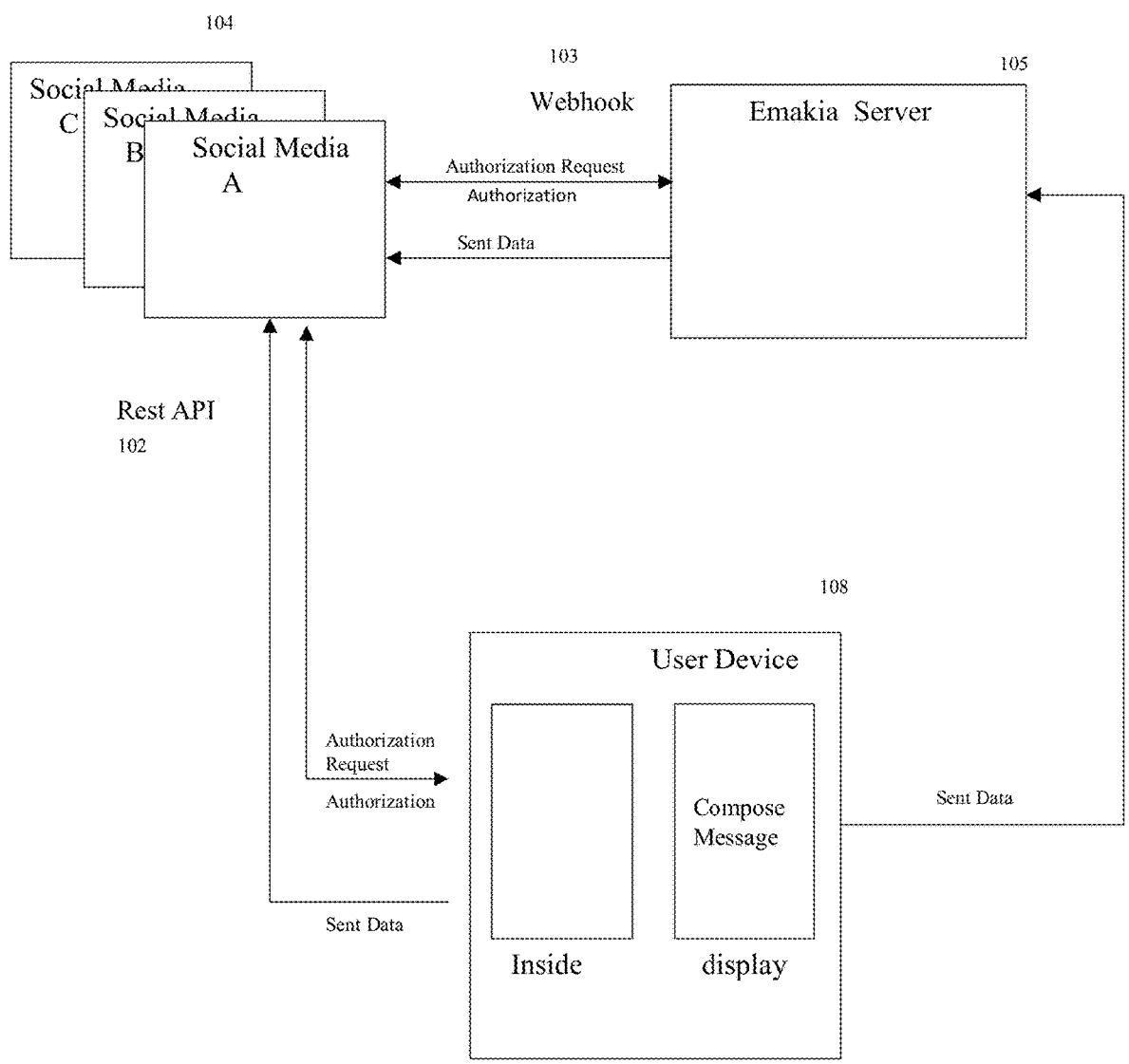

FIG. 11—Emakia system sender side.

Figure 12:
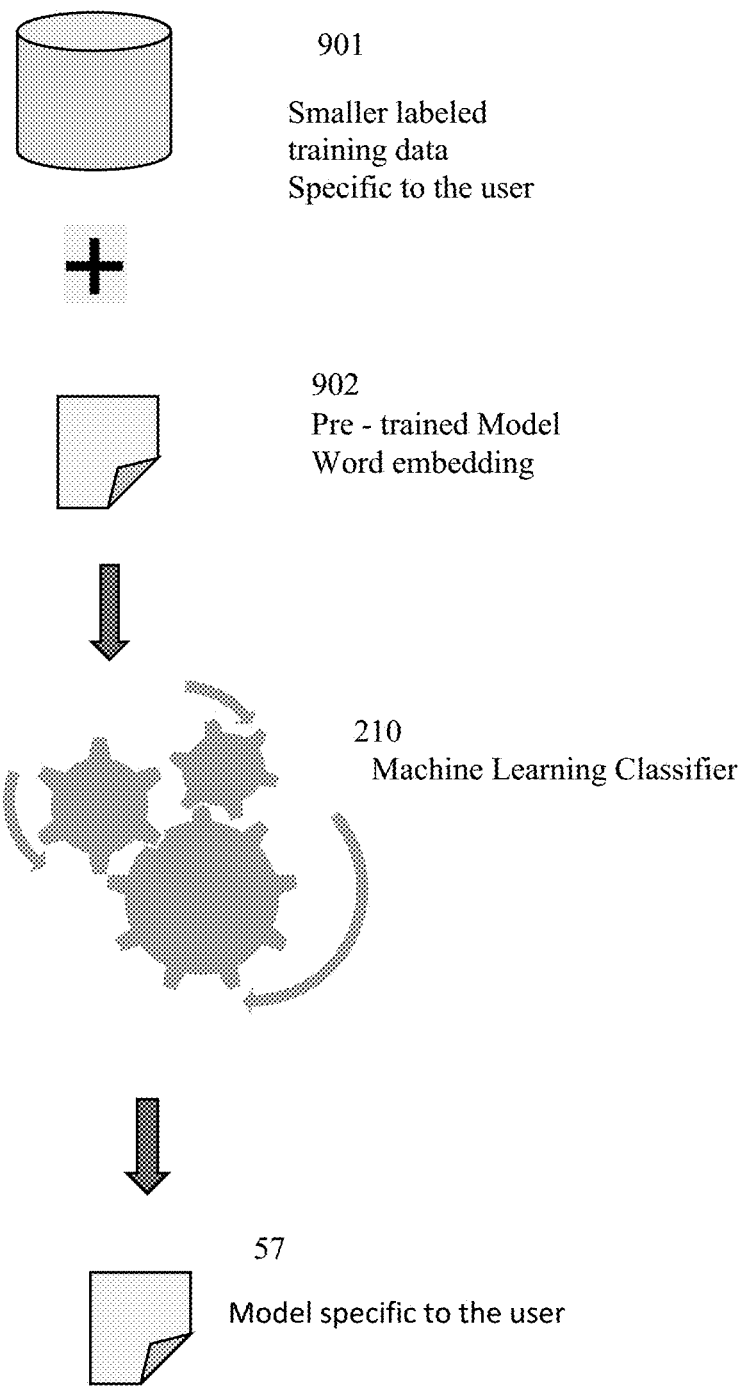

FIG. 12—Process of customization of the ML models.

Figure 13:
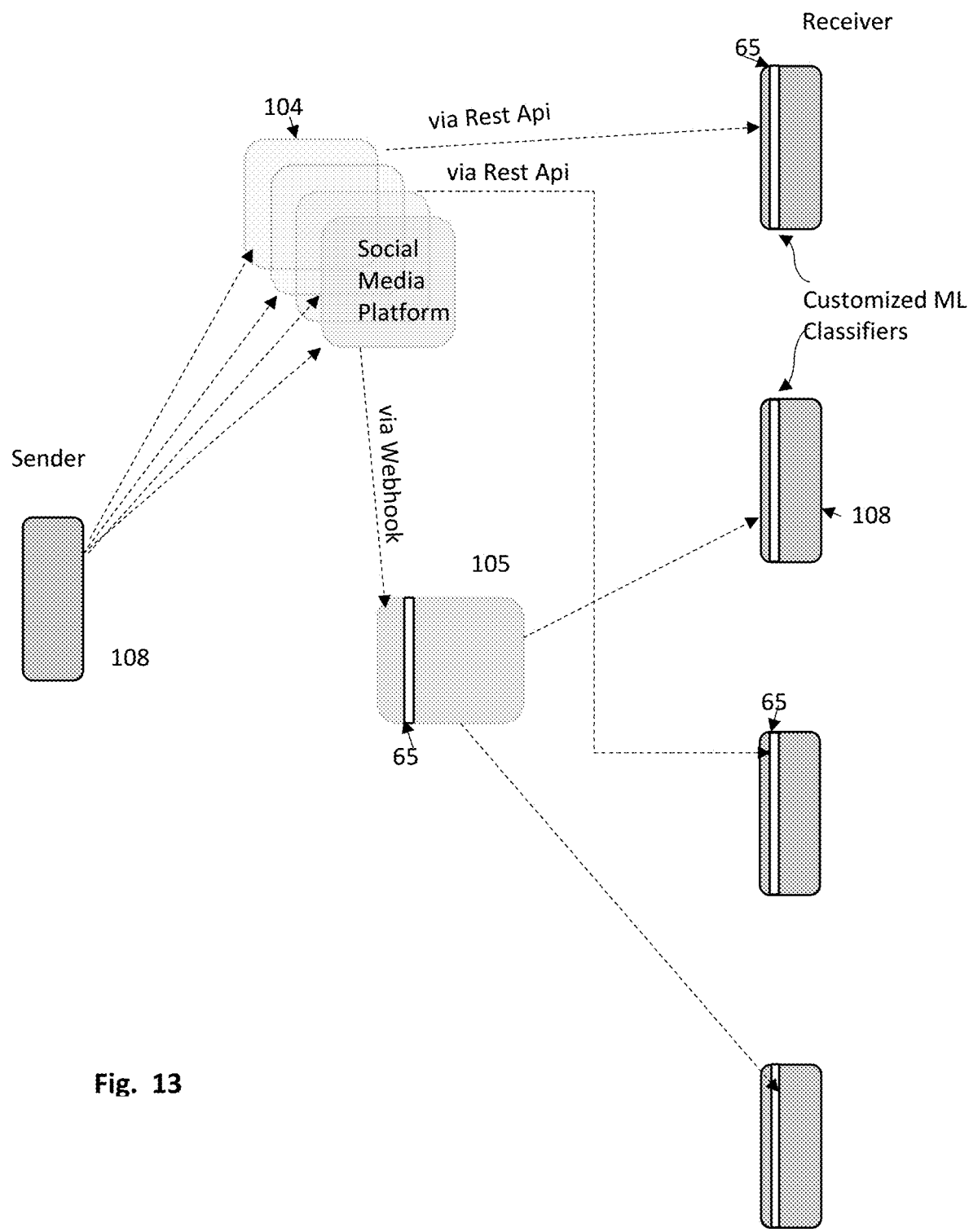

FIG. 13—Overview of data filtered with customized ML model.

5 DETAIL DESCRIPTION OF THE INVENTION

The method and system comprise several components: Receiver Side, Rest API, Webhook, Enaëlle (an application running on devices), data collection, training, evaluating and deploying of ML models on the user device, Reports and any additional programs to process and validate the data and the labelling.

FIG. 1 describes the incoming data 56, which are in text, image, video and audio format. The data from social media platforms 52, 53, 54, 55 are processed in order to solve the harassing issue on social media. We apply a set 65 of ML classifier models 57, 58, 59, 60 on the incoming content 56. The classifier models from Apple Core ML 3 or Google Auto ML determine if the incoming data 56 is harassing. The classifier models separate the data into two sets: the harassment data set 62 and the neutral data set 61. Only the neutral data are displayed to the receiver; the harassing content is filtered out. The classification process is similar to the ML classifiers used to filter out spam from emails. See Appendix, p. 18. The Emakia system uses the Apple Core ML 3 classifier to create classifier models for the iPhone. For Android phones, the Emakia system uses AutoML provided by Google.

ML classifiers process incoming images, audio and video data to detect harassment. Also, an additional text classifier is trained with fake news data in order to detect incoming fake news. The incoming data from each platform are processed with a set of classifiers that were previously trained with its own labeled data to create a data-specific model.

5.1 System—Incoming Data FIG. 2

FIG. 2 describes how the system processes the incoming data 56 and how the data is transferred. ML classifier models 57, 58, 59, 60 are applied to the incoming data either on the device 116 or on the server 105 in order to filter out harassment.

5.1.a Data Transfer

Social media platforms transfer the content of user data to a third party via Rest API or Webhook depending on their own internal social media platform rules. The data are routed via two different paths, one path directly from social media platforms to the user device via Rest API 102 and the other from the social media platform to the Emakia server and then to the user device via Webhook 103. The data are usually delivered in JSON format.

Authorization Request 101:

Social media platforms 104 provide access to user data to third parties when the users input their username and password. The Emakia system does not have access to the latter two. The user runs the Enaëlle application 116 to seek an authorization request 101 from the social media company 104 to allow the Enaëlle application to access the user's data. The social media company provides a token to allow for continuous access. By saving the session, the user is able to re-enter the application without having to log in again.

Rest API 102:

The function of the Rest API is to pull the data. "Rest" stands for "Representational State Transfer" which provides a communication protocol between the user's device 108 and the social media platforms. API is the abbreviation for "Application Programming Interface," the protocol used to communicate with social media platforms. After authorization is granted, the protocol allows the user to request and receive data. The social media platform 104 transfers the data directly to the Enaelle application 116 via Rest API 102.

Webhook 103:

The function of the Webhook is to push the data to the Emakia server. Webhook 103 is typically used to transfer large amounts of data. No request for data is required. The social media platform sends data when it becomes available. The use of Webhook 103 requires Emakia to register a URL through a domain service provider. The URL becomes the endpoint where the data are received on the Emakia server 105.

Whenever there is new content for the user, the social media platform 104 sends the data via Webhook to the end-point on the Emakia server. The end-point is a URL. The Emakia server listens for user content at the end-point.

5.1.b Emakia Server 105

The system hardware needs to be expandable to accommodate increasing numbers of users and development growth. The different ML classifiers require the system to have high processing power. Google Cloud, AWS Amazon and like platforms provide usage CPU and memory that are expandable. The server needs to store labeled data in several languages 115, train and validate different ML classifiers for each language 114, and run additional programs. These programs collect harassment data; process text, image, audio, and video; and create reports of the harassment or fake news. The system runs on several cloud servers across different geographic regions.

The data are in English and Italian, and the text classifier models are trained with English labeled content and Italian labeled content. In future versions, the system will process additional languages and emoji.

Program Collecting Harassing Data 112:

Different in-house programs run on the server. One such program collects harassing tweets from Twitter in order to increase the size of the data set used to train the Text Classifier model. The program uses the standard search Twitter API to obtain specific harassment terms that are new to the labeled data set. The url https://api.twitter.com/1.1/search/tweets.json is Twitter's search API. The search returns a series of tweets containing harassment terms. Those tweets are labeled and added to the existing set. The program also allows searches for specific Twitter users in order to train the model to be exposed to different styles of writing. For instance, the program searched for former President Obama's tweets. After validating their content, those tweets were added to the labeled data set.

5.1.c Enaëlle Application 116

FIG. 2 shows the Enaelle application 116 running on the user device 108. The data is received via Rest API or via Webhook. Enaelle runs the processes 111, including the classifier models 65 that filter harassment in real-time on the incoming data; the other component represents what is displayed on the device 109.

Harassment content is separated but can still be accessed with the TabBar at the bottom of the display 110. The user is able to modify the labeling if the user considers the separated content as not harassing. Vice versa, neutral content can be labeled as harassing by sliding the content on the screen and moving it to a different category. The modifications made by the user are sent to the Emakia server to retrain the Model with the individual user preferences. The ML model will be trained or retrained with data based on what users define to be harassment or not. When the Harassment content is detected a report 107 is sent for further proceedings on solving the Harassment issue.

FIG. 3 show an Enaelle GUI 306, a portal to access social media platforms such as Twitter 301, Facebook 302, Instagram 303, Reddit 304, and others 305. The portal allows users to navigate from one social media platform to another in order to access their user data from that platform without being subject to harassment. FIG. 3 shows radio buttons but TabBar could be used instead of a radio button to access the social media data.

5.1.d ML Classifiers 65

ML classifiers 57, 58, 59, 60 are trained on the server and run either on the server 105 or the user device 108.

Text Classifier Model for Harassment:

FIG. 4 describes how the bag-of-words 201 acts as an adaptive filter to reduce text classifier inaccuracy. The Emakia system uses the Apple Core ML 3 framework text classifier and Google AutoML. The trained model, when used with real-time data, is initially not 100% accurate. The accuracy of the model is then improved by increasing the size of the labeled data set by collecting more labeled data from different sources. To increase detection accuracy and to collect more data for retraining the model, the Emakia system uses a filter which is called a "bag-of-words." The bag-of-words acts as an adaptive filter by catching content as yet unknown to the model. Afterward, the model is retrained with the unknown content that has been classified by the bag-of-words filter as harassment. The bag-of-words is a list of harassing terms such as " . . . whore, slut, eating pussy, scum . . . " The bag-of-words is subdivided in three sets: one with hardcore terms; the second set with words evincing a milder harassing tone; and the third set with terms that have double meaning with one of the meanings being harassing. Content defined as harassing has at least one word from the hardcore set or the double meaning set and words from the set of moderately harassing words. The neutral content, however, may include words from the set with moderate words (e.g., the word "stupid") and the set with double meaning terms.

First, language detection 202 determines the language of the data. Then, a corresponding text classifier 57 is loaded to process the incoming data 56. The classifier labels the incoming content as harassing or neutral. In parallel, the data go through the bag-of-words filter 201. While the bag-of-words can aid to detect explicit abuse, it is used most effectively in reinforcing the model to be more accurate.

Results from the model and the bag-of-words filter are compared 203. If the model and filter results are the same, then the data are placed in the corresponding category 204. If the results differ 205, the decision of the filter overrides the one by the model. The discrepancy between model and filter results is reported to the Emakia server for analysis. On the server 105, the data collected with the correct label is used to retrain the model 116.

Image Classifier Model 68:

The Emakia system, in addition to detecting text harassment, also detects harassment on image content. Some images contain text; others do not. If the image contains a text, the system detects the text. FIG. 5 describes how to capture harassment on the text content of images 56, by applying an OCR Optical Characters Recognition 402 to perform text detection on the image. Once captured 403, the text is passed through the ML text classifier model 57 to detect harassment. If harassment is detected in the text 406, then the label for text content is set to harassing and the image is processed with a ML image classifier. If the text does not have harassment content the label for the text is set as neutral 405 and the image is run through the image classifier model to determine if the image is harassing or not. The Emakia system applies a set of processes 404 on the image to extract its features: color histogram; texture; edge-direction coherence vector, Fast Fourier Transform (FFT), face detection, and object detection, among others. The extracted features are entered as the parameter of the training of the model. The model is then run against the image data, a process that will result in the categorization of image content as harassing or neutral. The Apple Vision framework works with Core ML 3 to apply classification models to images, and to preprocess those images to make machine learning tasks easier and more reliable. See Appendix, p. 20. The open source MobileNet model, one of several available classification models, identifies an image using 1000 classification categories. Another available model is Visual Geometry Group (VGG), a convolutional neural network model proposed by K. Zisserman from the University of Oxford in the paper, "Very Deep Convolutional Networks for Large-Scale Image Recognition." The VGG model achieves 92.7% top-5 test accuracy in ImageNet, which is a dataset of over 14 million images belonging to 1000 classes.

The type of image classifier 58 depends on the operating system of the user device. Core ML 3 and Apple Vision framework and their models run on the IOS devices while AutoML Vision from Google Cloud and TensorFlow create models that run on Android devices. Core ML 3 and AutoML models allow for the training of customized models with customized data. A data source provides training or testing data to an ML image classifier 501.

ML Image Classifiers 501 is trained with an input of data 56 consisting of images which need to be categorized before the classifier can learn to recognize images. The categorization is done by naming folders FIG. 6.

In FIG. 6 the data 56 are organized on disk to be compatible with the ML Image classifier data source, the classifier 501 is initialized with the data source, a URL of the directory that contains the data. FIG. 6 shows two folders, one named Training Data 503, and the other Testing Data 502. Each folder is organized with subfolders that have been labeled with the name of the category Harassing 504 and Neutral 505. Then the images are located in the appropriate subfolders for each data category. No duplicate images are allowed in the data set.

Then, the ML Vision classifier model 58 is uploaded to the user mobile device to predict the content of received images in the user social media content.

Video Classifier Model 59:

For incoming data in video format, features of the video content are extracted. One of the first steps is to detect the area of focus against the background. The current frame is compared to the background to detect people and extract features. The video classifier processes the video content to separate harassing data from neutral data (You et al., 2017). YouTube-8M Segments dataset is an extension of the YouTube-8M dataset with human-verified segment annotations. In addition to having the videos annotated, the entities in the videos are temporally localized. YouTube-8M is a large-scale labeled video dataset that consists of millions of YouTube video IDs, with high-quality machine-generated annotations from a diverse vocabulary of 3,800+ visual entities. It comes with precomputed audio-visual features from billions of frames and audio segments. See Appendix, p. 42. For devices with an IOS operating system, the Core ML 3 video classifier runs with the Apple Vision framework in order to recognize, track objects, categorize and filter out harassing videos. For Android devices, AutoML Video Intelligence Classification enables one to train machine learning models to classify shots and segments of video data according to labels. AutoML Video Intelligence Object Tracking trains machine learning models to detect and track multiple objects in shots and segments. These models track objects in video data according to labels (harassment and neutral). See Appendix, p. 48. The data is presented to the video classifier in the same way shown in FIG. 6. Instead of having images in the folder, folder content consists of videos.

Audio Classifier Model 60:

Similarly, for incoming audio content, features of the audio are extracted and the audio data are processed through an audio classifier to filter out harassment (Nam et al., 2016). The VGGish model extracts the audio part of the video. The VGGish uses the same architecture as the VGG model and replaces the input image with an audio spectrogram (Hershey et al., 2017). The TensorFlow VGGish model is used as a feature extractor. Labeled data are fed a set of audio clips as the model input (Batra et al., 2019). For devices using the IOS operating system, an Apple Sound classifier with the Sound Analysis framework categorizes the data. To perform effectively, the model is trained with the awareness of the ambient noise of the environment. Speech recognition and voice analytics provide additional tools for the audio classifier model. The steps to process are to collect a labeled dataset of audio files and train a Create ML model. The sound classification used by the Core ML 3 model is using the SoundAnalysis and AVKit frameworks. See Appendix, p. 60. The incoming audio content has its features extracted. The data is presented to the audio classifier in the same way shown in FIG. 6. Instead of having images in the folder, the folder content consists of audio files. The audio classifier model 60 is uploaded on the mobile device to process real-time audio data to filter out harassment.

Text Classifier Model for Fake News 57:

We define fake news as false information that can be verified as not true. In order to train text classifiers 57 to detect fake and real news, a sizeable data set is needed for purposes of training the model. Each item of the set is labeled as "fake" or "real." The data set is gathered from data by scraping different web sites, https://mediabiasfactcheck.com a Media Bias/Fact Check website and the Washington Post fact-checking website provide lists of websites. See Appendix, p. 73. Additional fact-checking websites that can be used are listed on compilations provided by Wikipedia. See Appendix, p. 75. Phys.org quoted Professor Ulrich Schade of the Fraunhofer Institute for Communication, Information Processing and Ergonomics FKIE on the difficulty involved: "Fake news items are often hosted on websites designed to mimic the web presence of news agencies and can be difficult to distinguish from the genuine sites." See Appendix, p. 96. We process the data to extract the characteristics of what renders the content fake. With the fact extraction characteristics and with the labeled data we build a knowledge base with content labeled as "fake" or "real." The decision-making process of the classifier is based on language only by providing insights into the language used by fake news. The text classifier model is trained with the labeled data. Once the model is uploaded on the device, the incoming data are processed by the text classifier model trained to detect fake news in order to let the user know whether the content received is valid.

Video Classifier Model for Deepfake Video Detection 59:

Deepfake is used to create malicious hoaxes, fake news or revenge pornography. Deepfake is a technique to combine and superimpose images to create new content. The current Deepfake algorithm can only generate images of limited resolutions, which need to be further warped to match the original faces in the source video. Such transforms leave distinctive artifacts in the resulting Deepfake videos. We use a classifier to detect Deepfake, Face Swap and Lip Sync from audio. Lip Sync from audio files results when audio files of speech are blended with the head of a person different from the one who is talking. See Appendix, p. 98.

5.1.e Labeled Text Data

The Emakia system uses lots of labeled data to train the ML text classifier in order to have a well-performing model. The labeled data are gathered internally and externally.

External Text Labeled Data

The Emakia system uses two labels for text data: "harassment" and "neutral." If the external data to be used is labeled by the external source in more than two categories, then the Emakia system will combine them in only two categories. For instance, if the external source uses three categories labeled "abuse," "neutral" and "positive," then those three are merged into two categories: "harassment" and "neutral." The "neutral" label will now include the formerly labeled "neutral" and "positive" sets. The Emakia system uses the following sources of labeled text data:

NAACL_SRW_2016.csv (Waseem et al., 2016), "Hateful Symbols or Hateful People? Predictive Features for Hate Speech Detection on Twitter."

bullyingV3.0.zip (Xu, 2012), "Learning from bullying traces in social media."

http://research.cs.wisc.edu/bullying (has 7,321 annotated tweets in total).

Twitter-hate-speech-classifier-DFE-a845520.csv from data.world created on Nov. 21, 2016, by@crowdflowerdata.

Labeled data.csv (Waseem et al., 2016), "Understanding Abuse: A Typology of Abusive Language Detection Subtasks."

OnlineHarassmentDataset.csv (Golbeck et al., 2017), "A Large Labeled Corpus for Online Harassment Research."

InternalText Labeled Data

The Emakia system collects labeled text data internally in two different ways:

The Program Collecting Harassing Data uses the standard search Twitter API to obtain tweets with specific harassment terms unknown to the model.

By using the bag-of-words adaptive filter and retraining the text classifier with content yet unknown to the model.

The Italian data were gathered and labelled by Claudia Zaghi with a similar program which collects data with search Twitter API.

5.1f Bag-of-Words

The bag-of-words content consists of data from different sources. One source is the file "hatebase_dict.csv," provided by Hatebase, an online database of hate speech. The other source is the master thesis in computing sciences, "Automatic Detection of Cyberbullying on Social Media," by Love Engman. The bag-of-words is divided into three sets: the hardcore abusive set; the set of unpleasant terms; and one set of double meaning terms. The files are available in Appendix, p. 129.

5.1.g Validation of Labeled Data and Bag-of-Words

The labeled data are checked to verify that the data are labeled correctly and the bag of words sets are updated with new terms to the set. Content labeled as "harassment" should have at least one word from the hardcore set. The data labeled as neutral might contain some terms from the moderate set without being harassing. For instance the word "stupid" in a sentence does not make the sentence harassing. Harassing sentences usually contain several abusive words and moderate words and might contain terms with double meaning. If the sentence is one word and that word is abusive the sentence is abusive. To evaluate if a sentence is harassing, we compare its content against the three bag-of-words sets. For instance, if a sentence does not contain any words from any of the three bag of words set then the content should be labeled as neutral. If only moderate items are found then the data will be labeled as neutral. The bag-of-words can be updated by adding any missing harassing words and the data content can then be relabeled.

5.1.h ML Text Classifier Training & Testing

The Apple Core ML 3 text classifier and the AutoML classifier have been trained to recognize a pattern in the text, such as sentiments expressed in a sentence. FIG. 7 describes how Core ML 3 provides several fundamental NLP building blocks such as language identification 652, tokenization 653, part of speech tagging 654, lemmatization 655, and named entity recognition 656. These functionalities are provided across several different languages. Most NLP functionalities can be broken down into two broad categories of tasks:

Text classification: The objective in text classification—the text can either be a sentence, a paragraph, or a document—is to assign labels to this piece of text, and these labels can be sentiment labels, topic labels or any type of labels.

Word tagging: Given a sequence of words or tokens, the objective is to assign a label to every token in the sequence.

Core ML 3 has APIs in both text classification as well as word tagging. The sentiment analysis API is in seven different languages: English, French, Italian, German, Spanish, Portuguese, and simplified Chinese. The model learns to associate characteristics of the input text with labels. See Appendix, p. 133.

FIG. 8 shows different types of classification algorithms running: logistic regression 604, nearest neighbor classifier 606, Support Vector Machines (SVM) 602, boosted decision trees 605, random forests 603 and any additional ones if needed.

The Max Entropy (MaxEnt) 601 algorithm evaluates and decides which classification algorithms will train the data. The MaxEnt is based on the Principle of Maximum Entropy and from all the models that fit the training data, it selects the one which has the largest entropy. The MaxEnt classifier is used to solve a large variety of text classification problems such as topic classification, sentiment analysis and more. MaxEnt provides a framework for integrating information for classification from different algorithms.

The MaxEnt uses the training data to set constraints on the conditional distribution. Each constraint expresses a characteristic of the training data that should also be present in the learned distribution. MaxEnt performs well with dependent features. Internally, MaxEnt runs different sets of classification algorithms on a subset of the training data and uses a smaller subset of the training data (which becomes the testing set of the training set) to evaluate its own algorithm.

For Core ML 3 and AutoML, no tuning of parameters and hyperparameters are required, as it is done automatically. The hyperparameters are the variables that orchestrate the training process itself: the setup of the neural network; how many hidden layers between the input layer and output layer; and how many nodes each layer should have.

Apple Core ML 3 Text Classifier Training & Testing FIG. 9:

FIG. 9 shows the English input data consisting of 78,533 inputs 701 with 33% (25,655) labeled as harassing content and 67% (52,878) labeled as neutral content. The 78,533 inputs are split randomly with 80% of the data going toward the training set 702 and 20% toward the testing set 703, with a seed of 5. The data are parsed randomly in 0.101028 seconds into the two sets. The data are cleaned by removing all the duplicate inputs and changing uppercase characters to lower case characters. The data are put into a MLDataTable, which is a machine learning version of a spreadsheet in which each row represents an entity; in our case a tweet and the first column in the table is the text of the tweet and the second column the label. The MLDataTable is an Apple Core ML 3 structure that loads and processes large amounts of text in a tabular data format. The structure is designed to allow for the significant inputs of data that are required while performing machine learning.

Training:

The ML text classifier is initiated with the training data consisting of data content and a label for the specific content, either neutral or harassment. The model tokenizes the data and extracts its features. During the training, MLTextClassifier puts aside a small percentage of the training data to use for validating the model's progress during the training phase. The ML text classifier 210 puts aside 12,767 inputs out of the 62,640 inputs 702, to create a validation set 704. The validation set allows the training process to gauge the model's performance on examples the model hasn't been trained on. The evaluation accuracy describes how many examples are correctly labeled divided by the total number of examples. Depending on the validation accuracy, the training algorithm could adjust values within the model or even stop the training process when accuracy is deemed sufficient. After 25 to 29 iterations of training on the 3,185 input data (the testing portion of the training data), the model acquires an accuracy 705 of 0.993410 on the training data (99.35%). This level of accuracy was reached in 4.36 seconds.

Testing:

After acquiring training data accuracy of 99.35%, model performance was evaluated on the test data consisting of 15,893 inputs 706 that were set aside before the training.

The evaluation accuracy on the test data was 90.36%. The classification error is the fraction of incorrectly labeled data over total data. The classifier error on the test data is 9.64%. The evaluation accuracy and the classification error are useful metrics only when the data is well-balanced between categories.

Our data set is not balanced with 33% harassment versus 67% neutral. Furthermore, the portion of harassing tweets on Twitter is much smaller than 33%. Tables 1 and 2 reflect how imbalance affects the results.

Table 2 percentages are calculated from the values set forth in Table 1. To calculate the first row of Table 2 (Precision Recall Table) we define the following:

True Positive (TP): when the harassment content is labeled "harassment."

True Negative (TN): when the neutral content is labeled "neutral."

False Negative (FN): when neutral content is labeled "harassment."

False Positive (FP): when harassment content is labeled "neutral."

See Appendix, p. 143.

TABLE 1

Confusion matrix - English

| True\Predict | Harassment | Neutral |
| --- | --- | --- |
| Harassment | 4,309 (TP) | 727 (FP) |
| Neutral | 805 (FN) | 10,052 (TN) |

TABLE 2

Precision and Recall - English

| Class | Precision | Recall |
| --- | --- | --- |
| Harassment | 84.26% | 85.56% |
| Neutral | 93.26% | 92.59% |

TABLE 3

| | F1 Score | |
| --- | --- | --- |
| Class | Harassment | Neutral |
| F1 | 84.90 | 92.92 |

$$Precision = \frac{|TP|}{|TP|+|FP|}$$

$$Recall = \frac{|TP|}{|TP|+|FN|}$$

$$F1 = 2 * \frac{precision * recall}{precision + recall}$$

To calculate the second row of Table 2, we follow the same approach as when we calculated the first row, only this time TP reflects when the neutral content is labeled "neutral." Similarly, TN reflects the content labeled "harassment." FP and FN are re-assigned accordingly. Precision is the percentage of harassments detected compared to the total number of harassments. Recall is the percentage of harassment detected compared to the total number of items correctly detected either as harassment or as neutral.

Precision recall on the harassment set reflects more accurately how the model is performing on the harassment set and the neutral set. The evaluation accuracy of 90.36% 706 reflects the overall performance of the model on the entire set. The 85.56% and 84.26% percentages reflect how the model is performing on the harassing data. The 93.26% and 92.59% percentages reflect how the model is performing on the neutral set. The 85.56% and 84.26% percentages describe how effective the model is performing while detecting harassment.

Further testing employing real-time data continues to be conducted to test the accuracy of the model. The test consists of an application that is run on the device. Tweets are collected from a list of users. The list of users contains names from people with diverse backgrounds. Some are drawn by using Program Collecting Harassing Data to search for tweet authors with a high incidence of terms that have been deemed as harassing; others are people with a different style of writing that reflects their personality. The application displays tweets from the list of names. After receiving all the tweets from the list, the tweets are evaluated with the text classifier. The neutral tweets are displayed; TabBar allows the harassing content to be accessed. The application is a way to evaluate how text classifier is filtering out harassment on real-time data content. F1 Score is the weighted average of the Precision and Recall. Therefore this score takes both false positives and false negatives into account.

The Italian input data consists of 199,020 inputs 701 with 50% labeled as harassing content and 50% labeled as neutral content. The Italian training data consists of 127,177 inputs. The 25 ML classifier iterations create a model with an accuracy of 0.981. The ML classifier training using MaxEnt finishes in 11.84 seconds. The validation set of 31,959 inputs trains the ML classifier obtains an accuracy of 98.12%. The test data consist of 15,893 inputs; 89.38% precision and 87.07% recall were obtained for the harassing content. See Appendix, p. 147.

TABLE 4

| Confusion matrix - Italian | | |
| --- | --- | --- |
| True\Predict | Harassment | Neutral |
| Harassment | 16,984 | 2,523 |
| Neutral | 2,018 | 18,359 |

TABLE 5

| Precision and Recall - Italian | | |
| --- | --- | --- |
| Class | Precision | Recall |
| Harassment | 89.38% | 87.07% |
| Neutral | 87.92% | 90.10% |

TABLE 6

| F1 Score - Italian | | |
| --- | --- | --- |
| Class | Harassment | Neutral |
| F1 | 88.21 | 89 |

The Italian data set is more balanced with half harassment content and half neutral content. The precision and the recall percentage results between harassing content and neutral content are closer in range than for the English data set which is not a well-balanced set.

AutoML Text Classifier Training & Testing FIG. 9:

Google Cloud Natural Language API provides content classification; sentiment detection; and extracts entities and syntax analysis. AutoML Natural Language features custom entity extraction and custom sentiment analysis. The training set 702 consists of 62,575 English tweets with 20,433 labeled as "harassment" and 42,142 labeled as "neutral". The testing set 703 consists of 7,822 labeled tweets of which 2,554 are labeled as "harassment" and 5,268 as "neutral". See Appendix, p. 150.

TABLE 7

| Confusion matrix - English | | |
| --- | --- | --- |
| True\Predict | Harassment | Neutral |
| Harassment | 87% | 13% |
| Neutral | 2% | 98% |

TABLE 8

| Precision and Recall - English | |
| --- | --- |
| Precision | Recall |
| 94.36% | 94.36% |

The Italian data training set 702 consists of 99,938 inputs. The Auto ML Text classifier is still a beta version and the maximum input data that its structure can take is 100,000 inputs. The Italian data set exceeds the maximum so it was reduced to half. The Italian testing set 703 consists of 9,994 inputs.

See Appendix, p. 151.

TABLE 9

Confusion matrix - Italian

| True\Predict | Harassment | Neutral |
|---|---|---|
| Harassment | 95% | 5% |
| Neutral | 12% | 88% |

TABLE 10

Precision and Recall - Italian

| Precision (%) | Recall (%) |
|---|---|
| 91.74% | 91.74% |

5.1.j Improving the Prediction Result FIG. 10

FIG. 10 shows how to improve the prediction result of Core ML 3 57-a and AutoML, 57-*b* by running both models on the incoming data 56. The algorithm compares the results 801. If the results from both classifiers are the same the content data is added to the corresponding set 805. Harassing content is added to the harassing set. If the results from both classifiers differ 807, then a decision as to which set to assign the content is determined by considering the following elements: the harassing content; the interception of the content and the bag-of-words 201; the history of the harassing sender 804; the history of the sender's friends 803; and the history of the sender's followers 803. Depending on the evaluation of the different weighted elements, the content is added to the appropriate set 806.

5.1.k Report

When the classifier models 57, 58, 59, 60 detect harassment on the incoming data content 56, the harassment 62 and all the information about the senders and the receivers involved are sent to the Emakia server 105. FIG. 2 describes how a report 107 is sent to the Emakia system after the classifier models running on the server or the user device have detected harassment. The report contains the received harassing tweets and several components such as location, friends, and followers of the senders and of the receiver; this allows the harassment history of the sender to be better understood and recorded for future use.

The report analyzes how the harassment spreads, what the harassment topics are and the sentiments associated with them, the emotional connection feature of the harassment (e.g., sexual), points of view and geography (location of harasser; is he/she close by?). The report is sent to the appropriate responder 113 to solve the harassment issue depending on the intensity and the type of content. Reports are also sent to the corresponding social media company from where the content was derived of the issue and requests the removal of the content from the platform. Follow-up checks are done to see what action was taken by the social media company. Reports and analyses are stored to provide additional information on future reports. The report and any follow-ups will be sent to the users to inform them of the extent of the harassment threat.

The Emakia system generates a recommended action to address the conduct presented in the report. The urgency of the situation is taken into consideration. Outreach is done by asking, at the user's election, for professional intervention from social services, the education system, the judicial system, mental health providers, health providers, police, parents and others in order to help root out harassment and its consequences.

The offensive senders are blocked from sending additional content to the user.

2 System—Outgoing data FIG. 11

The transfer of the outgoing data between the device 108 and social media platforms 104 is similar to the transfer of incoming data. The ML classifier or process is not applied to the outgoing data. When the user composes a tweet, it is sent with no alteration.

5.3 Customized ML Models FIGS. 12, 13

FIG. 12 shows a smaller amount of labeled customer data 901 to train a model in conjunction with prior knowledge of the language Word Embeddings model 902 that provides a great deal of knowledge of the language. It is called Transfer Learning which is a highly active research area in NLP.

ML classifier 210 trains the model with the data 901 and the Word Embedding model; the outcome is a Core ML 3 model 57, Transfer Learning Text Classification model. One of purposes of embedding is to give different values for words depending on their meaning and context. Ordinary word embedding just maps words to vectors, and it will give the same value for the word no matter how it appears. The dynamic embedding changes the value of the embedding for words depending on their sentence context, which is a very powerful technique for doing Transfer Learning for Text Classification. See Appendix, p. 134.

FIG. 13 shows how customized ML classifier models 65 apply to incoming data on mobile devices 108 and on the Emakia server 105. No ML classifier models are applied to the sender content. The classifiers are tuned to the user's definition of what is harassing or not.

The embodiments discussed herein are illustrative of the present invention. As these embodiments of the present invention are described with reference to illustrations, various modifications or adaptations of the methods and/or specific structures described may become apparent to those skilled in the art. For example, the bag-of-words is divided into three sets, but it understood that the content and division and subdivision might be modified to accommodate the new data. Another example is the report that might evolve with input from different groups such as social platforms, school system, LGBT groups and more.

All such modifications, adaptations, or variations that rely upon teachings of the present invention, and through which these teachings have advanced the art, are considered to be within the scope of the present invention. For example, the comparison 203 might involve the Gazetteer from Core ML which is a text catalog. With the latest developments from Core ML and Auto ML, new functionalities are provided that should be incorporated into the Emakia system to fine-tune the accuracy. See Appendix, p. 133.

What is claimed is:

1. A method for filtering incoming social media data for a user on a mobile device, comprising:

transferring data from at least one social media platform to at least one user device, and at least one Emakia server;

collecting social media data with programs using search API calls;

creating a list of harassing terms into three sets: a first set with hardcore terms, a second set with words evincing a milder harassing tone, a third set with terms that have double meaning with one of the meanings being harassing;

defining harassing content, on at least one Emakia server, as having at least one word from the set with hardcore terms, or at least one word from the second set and at least one word from the third set;

labeling social media data content in any language including emojis as neutral or harassing;

training and evaluating classifier models with the labeled data in any language and any type of data;

running Enaëlle, an application, on the user mobile device;

detecting the language of the data content;

uploading the classifier model associated with detected language onto the user device;

filtering, on at least one Emakia server, incoming social media content with the classifier model, increasing a size of a labeled data set by collecting more labeled data from different sources;

increasing detection accuracy, on at least one Emakia server, and retraining the classifier model with an adaptive filter by catching content unknown to the classifier model with the three harassing sets;

defining harassing content allows the Emakia system to put in place a validation system that, validates the training set labeling during the classifiers' training and validates the model accuracy with the adaptive filter;

separating neutral content from unwanted content, unwanted content being harassing content or fake news;

displaying the neutral content in one tab of the mobile device in Enaëlle while harassing content is still accessible with a second tab of the mobile device in Enaëlle;

customizing the classifier model that has labeled harassing content and neutral content, by the user sliding the harassing content and the neutral content on a screen of the mobile device in Enaëlle and moving the harassing content and the neutral content to a different category, said customizing sent to the at least one Emakia server;

reporting unwanted content and recommending action to address conduct presented in a report, wherein the user can elect for professional intervention.

* * * * *